United States Patent [19]

Zagranski et al.

[11] Patent Number: 4,531,361
[45] Date of Patent: Jul. 30, 1985

[54] TORSIONAL MODE SUPPRESSOR

[75] Inventors: Raymond D. Zagranski, Somers; James J. Howlett, North Haven, both of Conn.

[73] Assignee: Chandler Evans, Inc., West Hartford, Conn.

[21] Appl. No.: 579,378

[22] Filed: Feb. 13, 1984

Related U.S. Application Data

[62] Division of Ser. No. 369,494, Apr. 19, 1982, Pat. No. 4,453,378.

[51] Int. Cl.³ .............................. F02C 3/10; F02C 9/28
[52] U.S. Cl. ................................. 60/39.161; 60/39.281
[58] Field of Search .............. 60/39.02, 39.161, 39.281

[56] References Cited

U.S. PATENT DOCUMENTS

| 3,006,144 | 10/1961 | Arnett et al. | 60/39.281 |
| 3,292,367 | 12/1966 | Bauger et al. | 60/39.141 |
| 3,520,133 | 7/1970 | Loft et al. | 60/39.281 |
| 3,688,495 | 9/1972 | Fehler et al. | 60/39.281 |
| 4,015,426 | 4/1977 | Hobo et al. | 60/39.281 |

Primary Examiner—Louis J. Casaregola

[57] ABSTRACT

Damping of a helicopter rotor drive train, the drive train including the free turbines of a gas turbine engine propulsion system, the aircraft main and tail rotors, and associated shafts and gears, is accomplished through active modulation of the fuel flow to the engine gas generator. The fuel flow is varied such that a transient torque will be developed by the free turbines which is opposite in phase to drive train resonances.

3 Claims, 2 Drawing Figures

TORSIONAL MODE SUPPRESSOR

This is a division of application Ser. No. 369,494, filed Apr. 19, 1982, U.S. Pat. No. 4,453,378.

BACKGROUND OF THE INVENTION:

(1) Field of the Invention

The present invention relates to the exercise of control over a gas turbine engine and particularly to the use of a free turbine engine employed in a helicopter rotor drive system as a means for damping oscillations in the drive system. More specifically, this invention is directed to apparatus for controlling the delivery of fuel to the gas generator of a turboshaft propulsion system and especially to a fuel control for rotary wing aircraft wherein fuel flow is varied as a function of speed oscillations of the rotor drive train. Accordingly, the general objects of the present invention are to provide novel and improved methods and apparatus of such character.

(2) Description of the Prior Art

The typical helicopter rotor drive train consists of a turboshaft engine comprising a gas generator and free turbines, the turbines being mechanically coupled to the main and tail rotors of the vehicle. This drive train is a highly resonant system with primary modes, which are separate for the main and tail rotors, in the 2 to 8Hz frequency range. While some damping of this system results from the aerodynamic drag on the rotor blades, gear reductions and other inherent losses in the system, considerable additional damping is nevertheless highly desirable. It has previously been difficult to provide additional active damping in a typical rigid rotor system. In a fully articulated rotor system, where the individual main rotor blades are supported such that they may undergo limited movement in two directions with respect to the rotor hub, the damping may be increased through the use of viscous lag dampers installed between each blade and the hub. These hydro-mechanical lag dampers are, however, subject to possible failure due, by way of example only, to damage when the vehicle is operated in a combat zone.

Continuing with the above discussion, when a helicopter is exposed to a wind gust or there is a sudden change in collective pitch commensurate with a commanded maneuver, the rotor drive train may "ring", i.e., go into oscillation. The frequency of the load change, i.e., the wind gust or collective pitch variation, may be such that the magnitude of the oscillation will be substantial. It is to be noted that this oscillation is, in part, possible because the mechanical drive train, which includes a free turbine, is decoupled from the gas generator.

It is to be noted that the stability of the engine and rotor system as a whole can be maintained. Thus, the sensed free turbine output shaft speed is customarily employed as a control parameter in the closed loop system. However, damping of the rotor drive train is not enhanced by presently available closed loop controls since, in order to maintain closed loop stability, existing gas generator fuel control technology calls for the filtering of the resonant frequencies from the free turbine speed feedback signal. This removal of transient signals from the free turbine speed input signal to the fuel control is in the interest of insuring that the gas generator will not be operated in a mode which would actually excite the resonant rotor drive train. It should, incidentally, be noted that present fuel controls actually reduce to some extent any damping of the mechanical drive system since the filtering does not remove all short term free turbine speed variations from the feedback signal commensurate with free turbine speed.

SUMMARY OF THE INVENTION

The present invention overcomes the above-discussed disadvantages of the prior art by providing a novel and improved technique for exercising control over the gas generator of a helicopter drive system which includes a free turbine type engine. In accordance with the present invention the fuel flow to the gas generator is modulated to produce transient variations in output torque which are opposite in phase to short term variations in free turbine speed. Accordingly, while the inertia of the gas generator is such that its speed will remain essentially constant, the fuel flow thereto will be adjusted to thereby vary torque in such a manner as to damp the mechanical system.

Apparatus in accordance with the present invention comprises control circuitry, responsive to the sensed speed of the free turbine of a helicopter rotor drive train, for generating a fuel control input signal which will result in the burning of more or less fuel to thereby vary the output torque of the essentially constant speed gas generator in phase opposition to free turbine speed oscillations in the resonant frequency range.

BRIEF DESCRIPTION OF THE DRAWING

The present invention may be better understood and its numerous objects and advantages will become apparent to those skilled in the art by reference to the accompanying drawing wherein.

DESCRIPTION OF THE PREFERRED EMBODIMENT

Figure 1:
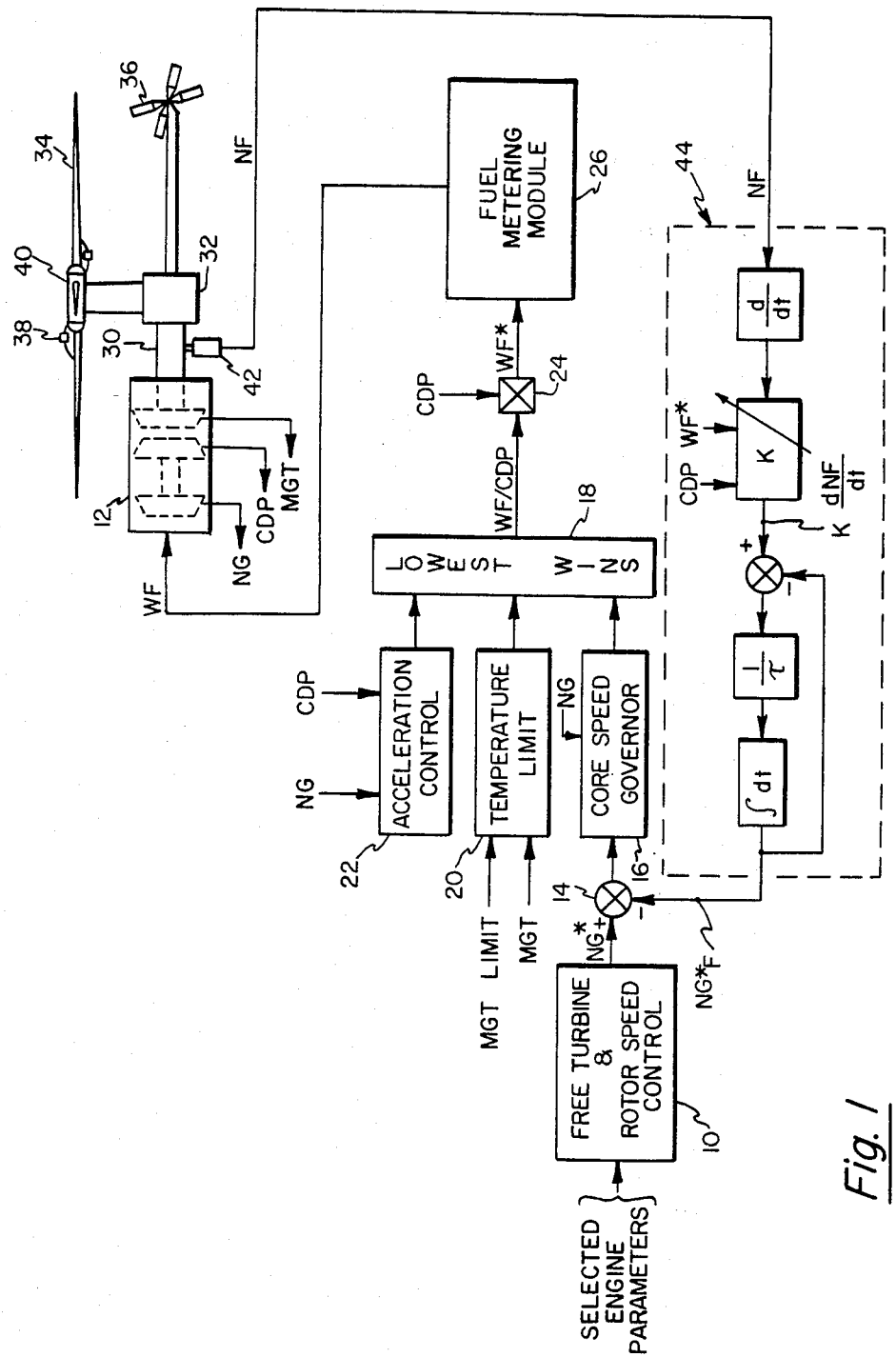
FIG. 1 is a functional block diagram of a turboshaft engine fuel control in accordance with a preferred embodiment of the present invention.

With reference now to FIG. 1, means for generating a fuel flow command NG* signal is indicated at 10. The NG* signal generator will be a state-of-the-art electronic fuel control. The inputs to command signal generator 10 will typically comprise the following:

NF*—pilot's rotor speed command
NF—free (power) turbine speed
NR—main rotor shaft speed
C/P—collective pitch command signal Command signal generator 10 is the primary electronic control for fuel flow to the engine which has been indicated schematically at 12. It is to be noted that the NF signal which is inputted to command signal generator 10 will be filtered to remove, to the extent possible, free turbine speed variations in the 2 to 8 HZ range.

The NG* command signal provided by generator 10 is delivered, via a summing circuit 14 which will be discussed in greater detail below, to a speed governor 16. Speed governor 16 is a conventional proportional controller which compares the commanded speed with the actual sensed gas generator speed NG, provides a speed error signal and multiplies that speed error signal by a constant to provide a first signal commensurate with fuel flow, i.e., WF, as a function of compressor discharge pressure, CDP.

The output of governor 16 is applied as a first input to an auctioneering circuit 18. A second input to auctioneering circuit 18 comprises a temperature limit signal from a proportional temperature controller 20. Controller 20 receives, as its input signals, an MGT signal commensurate with actual gas generator tailpipe temperature and a MGT limit signal. If the actual sensed temperature exceeds the programmed limit, controller 20 will generate a fuel flow reduction command. Thus controller 20 will provide a second fuel flow related signal to auctioneering circuit 18, i.e., a second signal commensurate with fuel flow WF as a function of a gas generator compressor discharge pressure CDP.

The third WF/CDP input signal to auctioneering circuit 18 comprises the output of an adaptive acceleration control 22. Acceleration control 22, receives the signals commensurate with sensed NG and CDP as inputs.

Auctioneering circuit 18 passes that one of the input signals thereto which corresponds to the least fuel flow. The signal selected by auctioneering circuit 18 is applied as a first input to an altitude compensation circuit 24 which may comprise merely a multiplier. A second input to altitude compensation circuit 24 is a CDP signal commensurate with actual sensed gas generator compressure discharge pressure. Accordingly, the output of altitude compensation circuit 24 is the fuel flow demand signal WF*.

The WF* signal from compensation circuit 24 is delivered as the control input to the electromechanical metering device 26 where it sets the rate of delivery of fuel to engine 12 in the conventional manner. The pressurized fuel, WF, which passes through metering device 26 is delivered to engine 12 which, in the embodiment being described, and as shown schematically, comprises a gas generator and a free turbine.

The output shaft 30 of the free turbine engine 12 is coupled, via a gear box 32, to the drives for the main rotor 34 and the tail rotor 36 of a helicopter. If the helicopter employs an articulated rotor system, lag dampers, as indicated schematically at 38, may be coupled between the blades of main rotor 34 and the rotor hub 40.

As is prior art practice, and in accordance with the present invention, a suitable speed sensor 42 will be coupled to the free turbine shaft 30. Speed sensore 42 will provide an NF output signal which is commensurate with free turbine speed. This NF signal, after appropriate filtering as described above, will be delivered as one of the inputs of the command signal generator 10. The NF signal will also be delivered as the input to a damping circuit which has been indicated generally at 44. Damping circuit 44 will, in the manner to be described below, provide a $NG^*_F$ fuel flow adjustment signal which, when summed with the NG* command signal in summing circuit 14, will cause the fuel flow related signal provided by proportional governor 16 to vary in such a manner as to cause, when this signal is selected by auctioneering circuit 18, the fuel flow WF to vary so as to produce a damping torque which opposes free turbine speed variations. The NF input signal to damping circuit 44 is differentiated to produce a (dNF/dt) signal which varies as a function of the frequency and amplitude of the power turbine speed variations. Thus, by differentiating the NF signal, lower frequency variations thereof are attenuated while "high" frequency variations are passed. The differentiated signal is multiplied by a constant K. The K(dNF/dt) signal, which leads the NF speed signal by 90° of phase shift due to the differentiation, is further shaped to achieve the desired gain and phase relationship to the NF speed variations. Thus, the $NG^*_F$ output signal from damping circuit 44 is fed back, compared with the K(dNF/dt) signal, the error multiplied by a gain $1/\tau$ and the product integrated. This feedback loop, in accordance with conventional control system practice, produces a first order lag of $\tau$ seconds and introduces additional attenuation and phase lag. Therefore, above a preselected frequency equal to $1/2\pi\tau$, for example 2 Hz, the gain of the damping circuit will be at its maximum and constant. Also, the fuel flow adjustment signal $NG^*_F$ will lead the speed signal NF by approximately 40°. The metering system will introduce additional lag to the negatively summed NG* and $NG^*_F$ signals, the summation producing a reversal in sign, with the result that the fuel flow WF to the engine will be essentially 180° out of phase with the free turbine speed NF at the resonant frequency of the rotor drive train.

It is to be noted that the constant K and/or the time constant $\tau$ may be caused to vary as a function of either or both of compressor discharge compressor CDP and the fuel flow command WF*. The variation in the constant K and/or the time constant $\tau$, if employed, will provide compensation for the inherent lags in the fuel metering system 26 which may be attributed to the fact that the fuel metering valve has a limited slewing velocity and the dynamics of the metering system are a function of back pressure.

To summarize the operation of the damping circuit 44, the circuit functions as a high pass filter which allows resonant oscillations of the rotor drive train to pass with a change in phase while lower frequency signals associated with normal engine and rotor system transients are blocked so as not to interfer with primary control functions. The comparatively high frequency feedback signals are processed by the fuel control system into a reduction in fuel flow in the case of an increase in free turbine speed. A decrease in fuel flow will result in a reduction of output torque which opposes the increase in rotor/free turbine speed. The phasing of the variations in metered fuel flow WF to the engine is critical. For the desired drive train damping to be achieved, WF must be essentially 180° out of phase with the high frequency variations in NF. For small drive train oscillations the slew rate of the fuel metering system is not reached. However, for larger oscillations both the slew rate limit of the fuel metering system and the aceleration and temperature limits in the engine control will have the effect of introducing non-linear attenuation and phase lag which must be cancelled by the damping algorithm. In accordance with the preferred embodiment of the present invention, as described above, the gain K and the time constant $\tau$ of damping circuit 44 are self-adjusting as a function of input oscillation magnitude.

Figure 2:
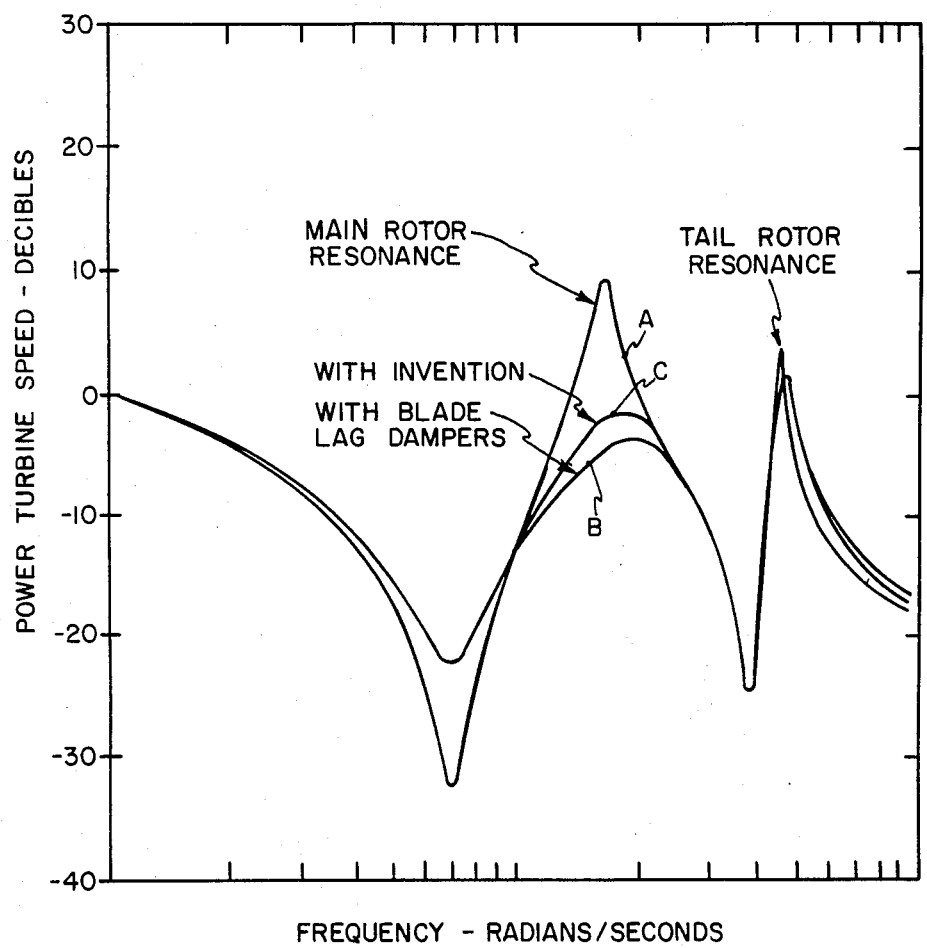
FIG. 2 is a graphical comparison which facilitates understanding of the apparatus of FIG. 1.

FIG. 2 is a plot of power turbine speed variations, in decibels, versus frequency which have resulted from a computer simulation of operation of the present invention in a helicopter environment wherein the helicopter was of the type which employed a fully articulated rotor. The simulation included the injection of a sinusoidal torque disturbance, of the type which would result from a wind gust or sudden maneuver, at the gear box. Without the damping system 44, and with the fuel flow demand from the electronic control held constant, a frequency scan was first made to define the resonant modes of the drive train. These resonant modes are depicted in FIG. 2 with curve A representing the case where there was neither electronic damping or mechanical lag dampers. As may clearly be seen from curve A, the drive train exhibits a highly undamped characteristic without either electronic or mechanical damping. In the case of curve B, whch is the simulated condition where the mechanical lag dampers were operative, it will be seen that the highly resonant main rotor mode is significantly attenuated. However, as indicated by curve C, which corresponds to use of only the electronic damping in accordance with the present invention, the performance of the rotor system closely approaches that which is obtained with the mechanical lag dampers. Thus, the present invention offers the possibility of elmination of or providing a backup in case of failure of the mechanical lag dampers in a case of a helicopter having an articulated blade system. Further, the present invention offers the possibility of providing rotor drive system resonant damping in the case of rigid rotor helicopters.

Returning again to a consideration of the damping circuit 44, this circuit functions in accordance with the following damping algorithm:

$$(NG^*_F/NF(s) = KS/(S+1)$$

where S is the derivative operator. The above transfer function defines a high pass filter which blocks low frequency inputs so as not to disturb the primary engine control loop. However, high frequencies are allowed to pass and create fuel flow, and thus torque, disturbances through the fast combustive path of the engine. As previously noted, the inherent inertia of the gas generator precludes its following the high frequency inputs, i.e., the speed of the gas generator will not change as a function of the $NG^*_F$ signal. The gain and time constants of the transfer function are selected to cancel the phase lag in the fuel metering system 26.

In summary, the present invention achieves damping of the rotor drive system of a helicopter through exercising control over the fuel flow to the power producing gas generator. It is to be noted that, for rotor disturbances larger than those associated with transient loads, and for hot day conditions, the engine must remain protected from over-temperature and surge. Therefore, rotor drive train damping through the engine may under some operating conditions be performed on only one-half of the drive train oscillation. That is, in accordance with the present invention fuel flow is lowered to oppose an increase in free turbine speed but will not be raised above acceleration or temperature limits to oppose a decrease in speed. Additionally, and as alluded to above, the slew rate of the fuel metering system is important with large magnitude speed oscillations and may introduce a phase lag which should be cancelled by the damping algorithim. Should phase lag introduced by the fuel metering system become important, the damping function may be made adaptive in nature by varying gain as a function of either or both compressor discharge pressure or fuel flow demand.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. In a fuel control system for a rotary wing aircraft, the aircraft having an engine comprising a gas generator and a power turbine mechanically decoupled from and driven by the gas generator, the fuel control system including means for producing a gas generator fuel supply command, the improvement comprising:
   means for providing a signal commensurate with power turbine speed;
   means responsive to said signal commensurate with turbine speed for providing a damping control signal commensurate with speed variations at frequencies in excess of a predetermined minimum, said damping control signal being out of phase with the sensed speed variations;
   means for modulating said fuel supply command signal with said damping control signal to produce variations in said fuel supply command signal; and
   means responsive to said fuel supply command signal for varying the rate of delivery of fuel to the gas generator to thereby cause the torque produced by the power turbine to oppose variations in speed above the said predetermined frequency.

2. The apparatus of claim 1 wherein said fuel control system provides a gas generator speed command signal and wherein said modulating means comprises:
   means for summing said speed command and damping control signals to produce a variable speed command signal;
   means responsive to said variable speed command signal and a signal commensurate with actual gas generator speed for producing a first fuel supply command signal; and
   means for compensating said first fuel supply command signal for altitude.

3. The apparatus of claim 2 wherein said modulating means further comprises:
   means for producing a second fuel supply command signal, said second fuel supply command signal being a function of a gas generator temperature limit; and
   means for selecting that one of said fuel supply command signals which commands the lesser fuel flow for delivery to said altitude compensation means.

* * * * *